Figure 1:
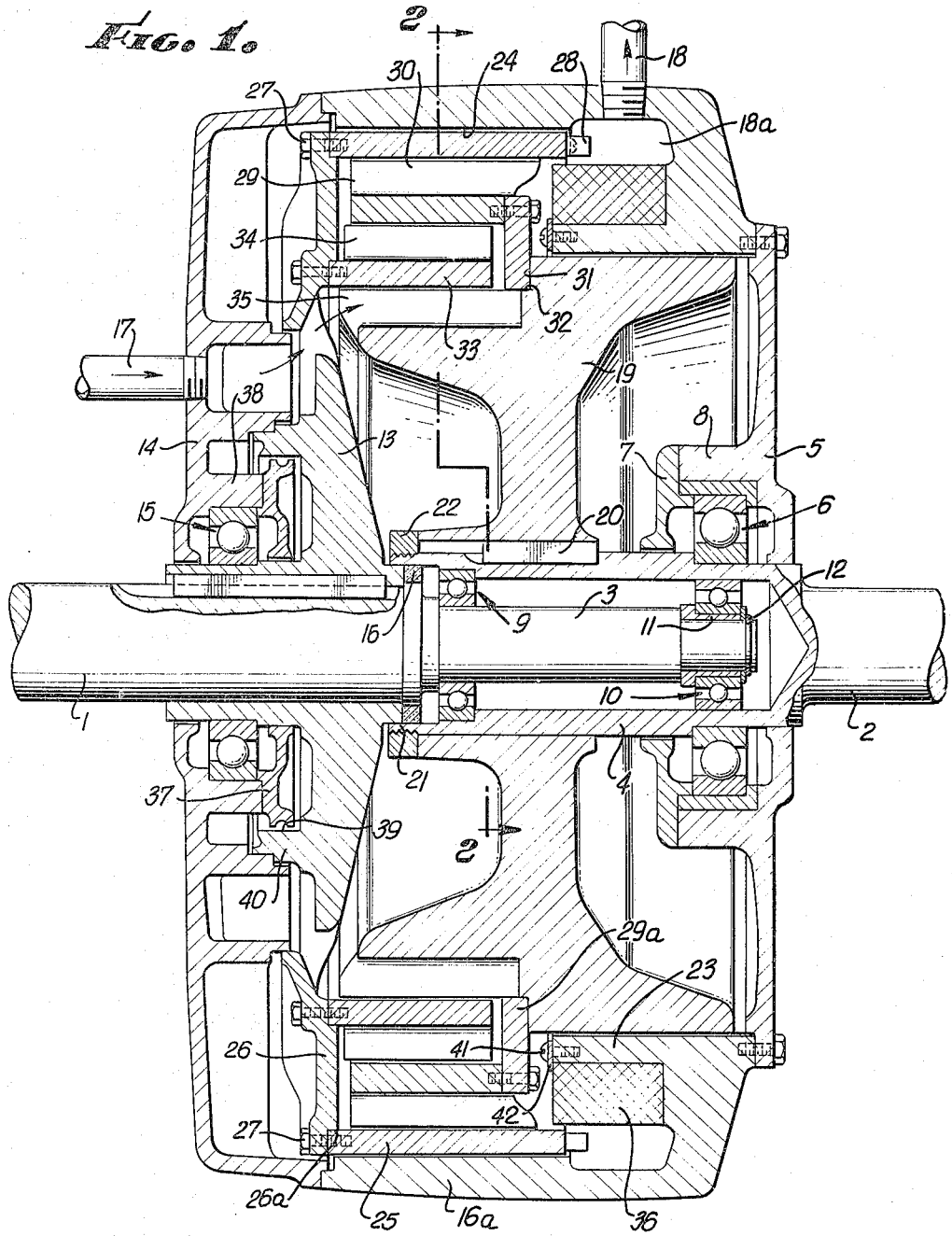

Nov. 2, 1965  R. C. WOODWARD, JR  3,215,874
MAGNETIC CLUTCH
Filed July 24, 1961  2 Sheets-Sheet 1

INVENTOR.
RICHARD C. WOODWARD, JR.
BY
Flam and Flam
ATTORNEYS.

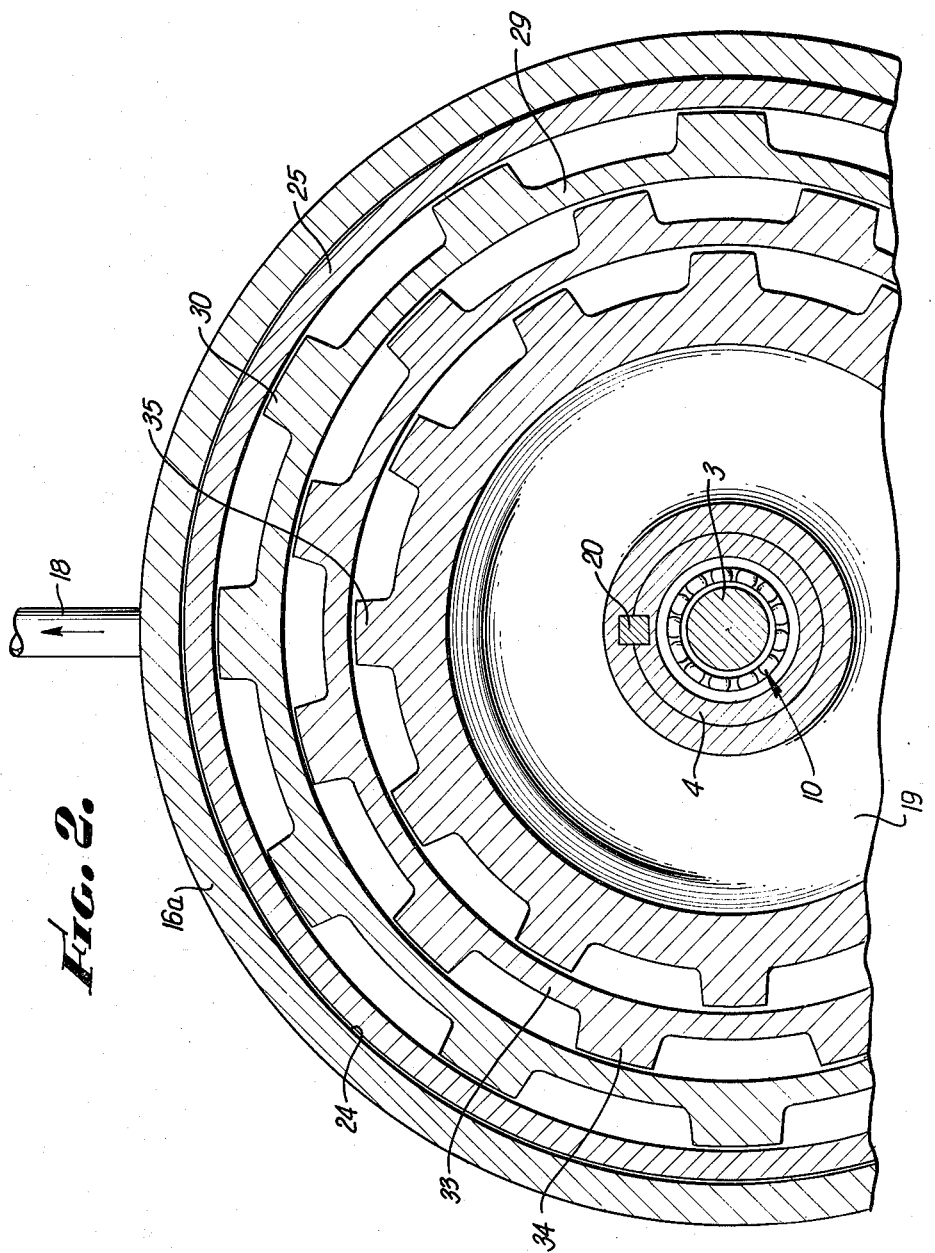

3,215,874
MAGNETIC CLUTCH
Richard C. Woodward, Jr., Fullerton, Calif., assignor, by mesne assignments, to Emerson Electric Co., a corporation of Missouri
Filed July 24, 1961, Ser. No. 126,318
5 Claims. (Cl. 310—105)

This invention relates to magnetic clutches. Such clutches serve also to provide a speed change between the elements of the clutch, both being rotary, and the driven element having a lower rate of rotation than the driving element. The degree of lag or slip is determined by the strength of the magnetic flux linking the two elements.

The general structure of such clutches is now well known. The driven element for example may be a toothed rotor of magnetic material, and the driving element a drum of magnetic material extending around the driven element. A magnetizing coil is so arranged that magnetic flux proceeds across the gap between the drum and the toothed rotor.

When it is desired to increase the maximum driving torque between the clutch elements, the drum area overlying the rotor may be increased. An increase in area may be effected by either enlarging the diameters of the drum and rotor, or by elongating them in an axial direction. Both of these expedients involve design difficulties; for example, an axial elongation presents problems in maintaining the parts truly concentric.

It is one of the objects of this invention to obviate these difficulties, and to make it possible to maintain the axial length within tolerable limits.

In order to accomplish this result, each clutch element is provided with additional annular members mutually interleaved, thus providing for a plurality of radially spaced air gaps. In this way, the radial dimensions, while increased, permit a relatively compact structure in which excessive weight is avoided.

It is still another object of this invention to facilitate the circulation of a cooling liquid past the clutch elements.

This invention possesses many other advantages and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIGURE 1 is a longitudinal sectional view of a magnetic clutch incorporating the invention; and FIG. 2 is a sectional view taken along a plane corresponding to line 2—2 of FIG. 1.

In FIG. 1 a pair of shafts 1 and 2 is indicated mounted on a common axis, and adapted respectively to carry the cooperating clutch elements. Shaft 1 has a reduced portion 3 adapted to be piloted within the hollow enlarged portion 4 of the shaft 2. Either shaft 1 or 2 may be the input shaft, and the other serving as the output shaft.

In the present instance, we may assume that the shaft 1 is the input shaft and shaft 2 is the output shaft.

The output shaft 2 is rotatably mounted within an end bracket 5 by the aid of a ball bearing structure 6. Furthermore, a collar 7 may be appropriately attached to the inner hub 8 of the bracket 5, to hold the bearing structure 6 in place.

The reduced portion 3 of shaft 1 is piloted within the hollow portion 4 by the aid of ball bearing structures 9 and 10. The ball bearing structure 10 is mounted on a sleeve 11 held against removal from the shaft portion 3 by the aid of a spring ring 12.

The shaft 1 has keyed to it a support 13 made of non-magnetic material. The shaft is supported within an end bracket 14 by the aid of the ball bearing structure 15. The shaft 1 carries a sealing ring 16 of suitable well-known design, so as to seal off the interior of the hollow portion 4 of shaft 2.

The brackets 5 and 14 are appropriately attached to a frame or casing 16a formed of magnetic material so as to define an enclosure for all of the operating parts of the mechanism. In order to cool the mechanism, an inlet water pipe 17 is provided threaded into the wall of the bracket 14. An outlet water pipe 18 is provided. Pipe 18 communicates with a space 18a disposed near an end of the frame 16a remote from inlet 17. In this way, the water or other liquid must traverse the surfaces of the clutch elements mounted in frame 16a.

The hollow portion of shaft 2 carries a rotor structure 19 as by the aid of a key 20. The hollow portion 4 has a threaded extension 21 of reduced diameter extending over the sealing ring 16 and accommodating a clamping nut 22 for restraining the rotor structure 19 against axial movement.

The rotor structure is so arranged that it provides a plurality of magnetic ring-like elements or members. The magnetic frame 16a has a re-entrant sleeve-like portion 23 which overlies the right-hand portion of the rotor 19 and forms an air gap between these two parts.

The frame 16a also has an interior cylindrical surface 24 defining an air gap with a magnetic ring 25 forming a part of a clutch drum. This magnetic ring is carried by the non-magnetic member 13 as by the aid of an integral flange 26. This flange 26 defines a shoulder 26a against which the ring 25 may rest. Appropriate fastening means such machine screws 27 hold the ring in place. The other end of the ring 25 is free.

The right-hand edge of the ring 25 extends to the chamber 18a and carries an impeller including plurality of paddles 28 to facilitate the circulation of cooling liquid outwardly of space 18a.

Ring 25 forms an air gap with a ring 29. As shown most clearly in FIG. 2, the outer periphery of this ring 29 is provided with a series of uniformly spaced projections 30 that closely approach the cylindrical interior surface of the ring 25. This ring 29 is fastened at one end to a supporting ring 29a, made of non-magnetic material and attached to a surface 31 of the rotor structure 19 and resting upon a shoulder 32 formed at the base of the surface 31. The other end of the ring 29 is free.

The interior cylindrical surface of the ring 29, in turn, cooperates with another ring 33 that is supported by the non-magnetic member 26 in the same manner as ring 25. Thus the ring 33 is attached only at one end. This ring 33, as shown most clearly in FIG. 2, has radial projections 34 that closely approach the interior cylindrical surface of the ring 29.

Lastly, the rotor 19 at its left-hand end has an integral ring portion provided with radial teeth 35 which closely approach and form an air gap within the interior cylindrical surface of the ring 33. The clutch elements thus each comprise one or more rings interleaved so as to form concentric annular members.

The air gaps formed between adjacent rings are all in series in an electro-magnetic circuit magnetized, for example, by an annular coil 36, disposed over the sleeve 23. The coil is held against displacement by a ring 42 attached as by screws 41 to the edge of sleeve or flange 23.

Each intermediate ring 29 and 33 provides both an inner annular surface and an outer non-annular surface for operation both as an eddy current drum and a toothed element for a succeeding eddy current drum. One end ring as at 35 is non-annular to form the first toothed element and the other end ring 25 is annular to form the final eddy current drum element. Each ring cooperates with its next adjacent ring to produce cumulatively the desired magnetic coupling.

The cumulative effect of the rotor ring 29 and of the corresponding drum rings 25 and 33 is equivalent to an elongated drum structure. This interleaving of the ring elements of the clutch device thus provides a relatively short axial length and relatively light construction with an increased torque transmission.

The rings 25 and 33 on one shaft 1 together define a circularly extending channel facing in one direction, and the ring 29 and the ring portion of the rotor 19 on the shaft 2 define a circularly extending channel facing in the other direction. The ring 29 forms the outer wall of one channel that projects with end clearance into the channel formed by the rings 25 and 33. Reciprocally, ring 33 forms the inner wall of the other channel projecting with end clearance into the opposite channel. The non-annular parts of the rings not only form means for concentration of flux, but also paths for flow of the cooling fluid.

The water flow between the conduits 17 and 18 is such that the stream of water flows in a sinuous path thereby keeping the interrelated elements cool.

To prevent water from entering the bearing 15, use may be made of a water seal ring 37 fastened to the inwardly directed boss 38 formed on the bracket 14 and having a groove or grooves facing the interior cylindrical surface 39 formed on a flange 40 of the drum supporting member 13. Similar provisions may, if desired, be supported at the right-hand end of the structure so as to protect the bearing structure 6.

The inventor claims:

1. In a magnetic clutch structure: a pair of clutch elements; means mounting each of the elements for rotation about a common axis; a number of concentric rings of magnetic material and of different diameters having corresponding ends attached to one of the elements; the other ends of the rings being free; and a number of concentric rings of magnetic material and of different diameters having corresponding ends attached to the other of the elements, the other ends of the rings being free; the free ends of each of the sets of rings projecting with end clearance between the rings of the other set of rings; the intermediate rings and one end ring having non-annular surfaces opposing annular surfaces of the next adjacent ring to form areas of flux concentration upon the imposition of a magneto-motive force radially of the rings, and also to form passages for cooling fluid between the rings, the passages being joined sinuously together at the clearance spaces at the said one ends of the rings.

2. In a magnetic clutch structure: a pair of clutch elements; means mounting each of the elements for rotation about a common axis; a number of concentric rings of magnetic material and of different diameters having corresponding ends attached to one of the elements, the other ends of the rings being free; a number of concentric rings of magnetic material and of different diameters having corresponding ends attached to the other of the elements, the other ends of the rings being free; the free ends of each of the sets of rings projecting with end clearance between the rings of the other set of rings; the intermediate rings and one end ring having non-annular surface opposing annular surfaces of the next adjacent ring to form areas of flux concentration upon the imposition of a magneto-motive force radially of the rings, and also to form passages for cooling fluid between the rings, the passages being joined sinuously together at the clearance spaces at the said one ends of the rings; a housing for the elements; means forming spaces at opposite ends of the housing and in communication via said sinuously connected fluid passages; and means forming inlet and outlet connections from the respective spaces.

3. In a magnetic clutch structure: a pair of clutch elements; means mounting each of the elements for rotation about a common axis; a number of concentric rings of magnetic material and of different diameters having corresponding ends attached to one of the elements, the other ends of the rings being free; a number of concentric rings of magnetic material and of different diameters having corresponding ends attached to the other of the elements, the other ends of the rings being free; the free ends of each of the sets of rings projecting with end clearance between the rings of the other set of rings; the intermediate rings and one end ring having non-annular surfaces opposing annular surfaces of the next adjacent ring to form areas of flux concentration upon the imposition of a magneto-motive force radially of the rings, and also to form passages for cooling fluid between the rings, the passages being joined sinuously together at the clearance spaces at the said one ends of the rings; a housing for the elements; means forming spaces at opposite ends of the housing and in communication via said sinuously connected fluid passages; means forming inlet and outlet connections from the respective spaces; and rotary impeller means carried by one of said rings and projecting into one of said spaces for creating a pressure differential between the opposite ends of the connected sinuous passages.

4. In a magnetic clutch structure: a pair of clutch elements; means mounting the elements for rotation about a common axis; one of said elements having a circularly extending channel opening in one axial direction, the walls forming the opposed circularly extending sides of the channel being of magnetic material and magnetically separated from each other on said one clutch element; the other of said elements having a circularly extending channel opening in the other axial direction, the walls forming the opposed circularly extending sides of the channel being of magnetic material and magnetically separated from each other on said other clutch element; the channels being of slightly different diameters, and one wall of each of the channels projecting into the channel of the other of the elements to form an interleaving relationship; a frame having annular surfaces respectively in annular magnetic flux transfer relationship to the other walls of the channels; and a coil carried by the frame for applying a magneto-motive force radially across said interleaving walls; the said one walls and one of the other walls having non-annular surfaces at corresponding sides of the walls opposing annular surfaces of the next adjacent walls for creating a flux concentration and a torque coupling between the elements.

5. In a magnetic clutch structure: a pair of clutch elements; means mounting the elements for rotation about a common axis; one of said elements having a circularly extending channel opening in one axial direction, the walls forming the opposed circularly extending sides of the channel being of magnetic material and magnetically separated from each other on said one clutch element; the other of said elements having a circularly extending channel opening in the other axial direction, the walls forming the opposed circularly extending sides of the channel being of magnetic material and magnetically separated from each other on said other clutch element; the channels being of slightly different diameters, and one wall of each of the channels projecting into the channel of the other of the elements to form an interleaving relationship; a frame having annular surfaces respectively in annular magnetic flux transfer relationship to the other walls of the channels; a coil carried by the frame for applying a magneto-motive force radially across said interleaving walls; the said one walls and one of the other walls having non-annular surfaces at corresponding sides of the walls opposing annular surfaces of the next adjacent walls for creating a flux concentration and a torque coupling between the elements, said non-annular surfaces also forming passages for cooling fluid extending sinuously along the walls of the channels; housing means forming on opposite sides of the elements, spaces for cooling fluid in communication with each other via said passges; means forming inlet and outlet connections from the respective cooling fluid spaces; and rotary impeller means projecting into one of said cooling fluid spaces for creating a pressure differential between opposite ends of the sinuous passages.

References Cited by the Examiner

UNITED STATES PATENTS 2,488,827  11/49  Pensabene _____ 310—105

FOREIGN PATENTS 558,961  1/44  Great Britain.

MILTON O. HIRSHFIELD, *Primary Examiner.*

DAVID X. SLINEY, *Examiner.*